May 9, 1950

G. B. SAYRE 2,506,814

APPARATUS FOR THE ELECTRONIC HEATING OF MOLDING MATERIAL

Filed Jan. 17, 1947

INVENTOR.
GORDON B. SAYRE

BY *James and Franklin*

ATTORNEY

May 9, 1950  G. B. SAYRE  2,506,814
APPARATUS FOR THE ELECTRONIC
HEATING OF MOLDING MATERIAL
Filed Jan. 17, 1947  6 Sheets-Sheet 2
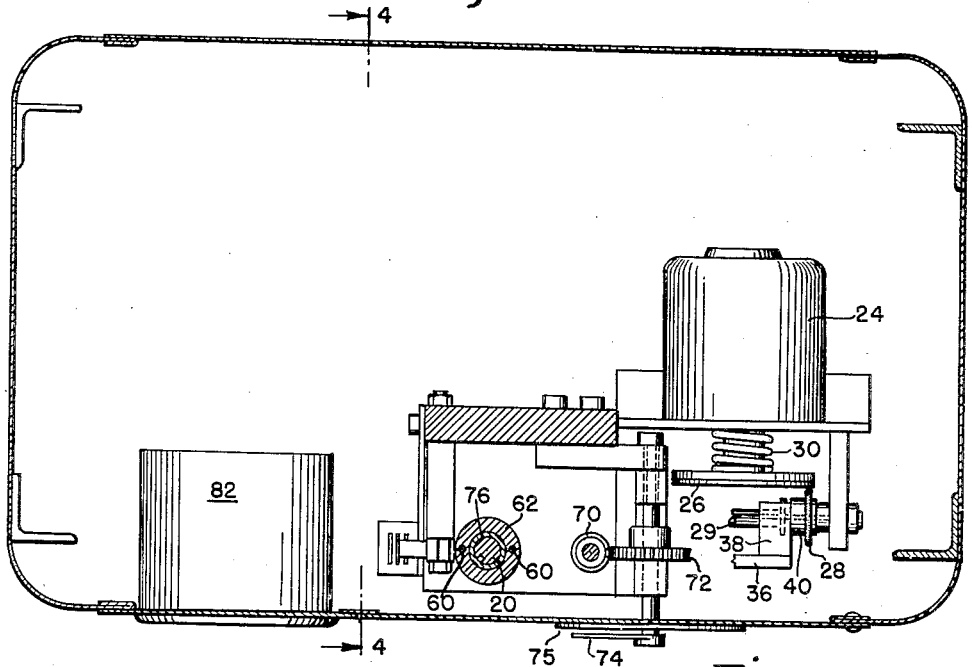
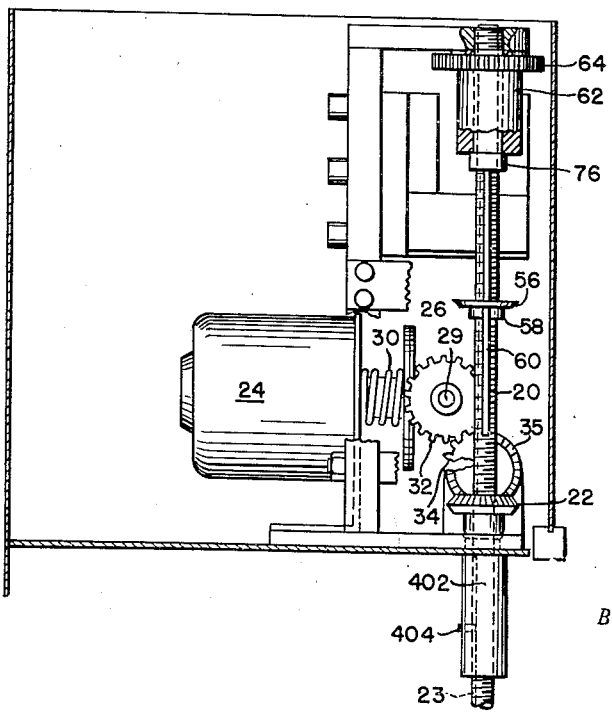
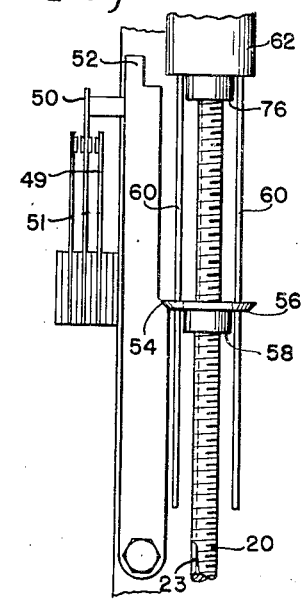
INVENTOR.
GORDON B. SAYRE
BY James and Franklin
ATTORNEY

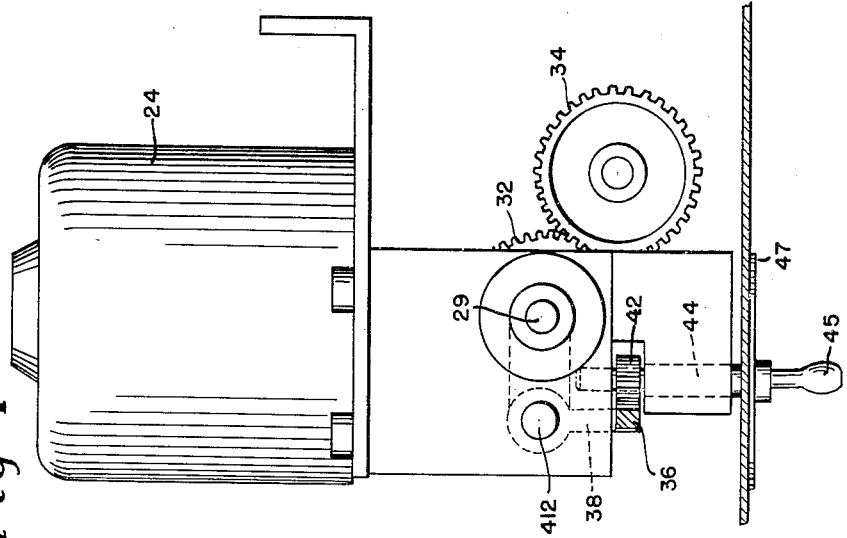
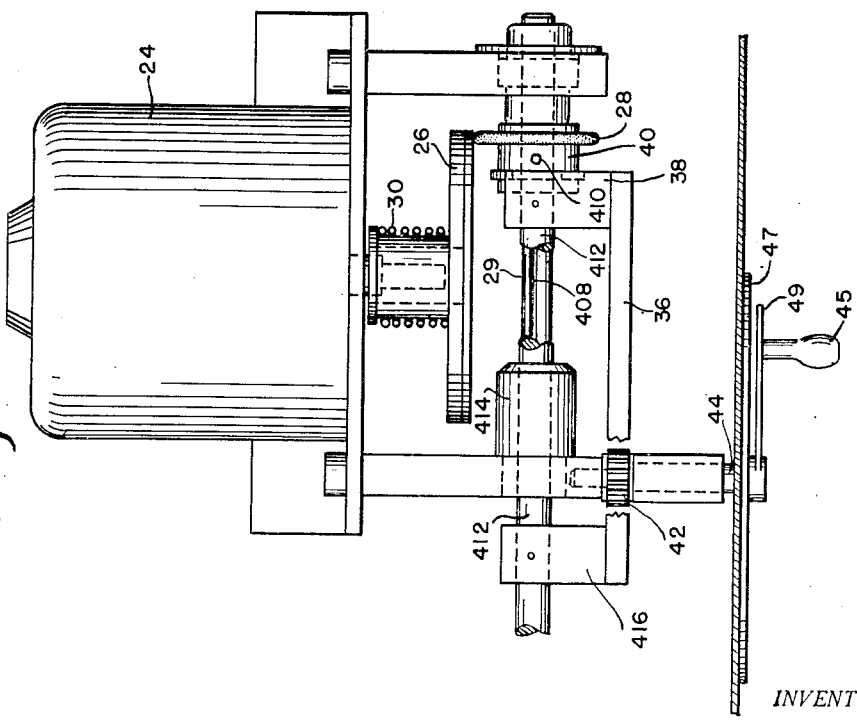

May 9, 1950

G. B. SAYRE
APPARATUS FOR THE ELECTRONIC
HEATING OF MOLDING MATERIAL 2,506,814

Filed Jan. 17, 1947

INVENTOR.
GORDON B SAYRE

BY James and Franklin
ATTORNEY

May 9, 1950

G. B. SAYRE 2,506,814

APPARATUS FOR THE ELECTRONIC
HEATING OF MOLDING MATERIAL

Filed Jan. 17, 1947

INVENTOR
GORDON B. SAYRE
BY
James and Faulkner
ATTORNEY

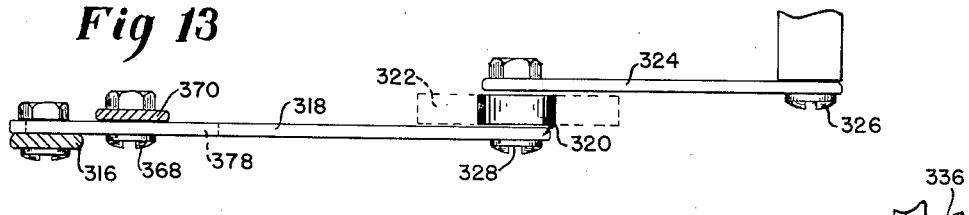
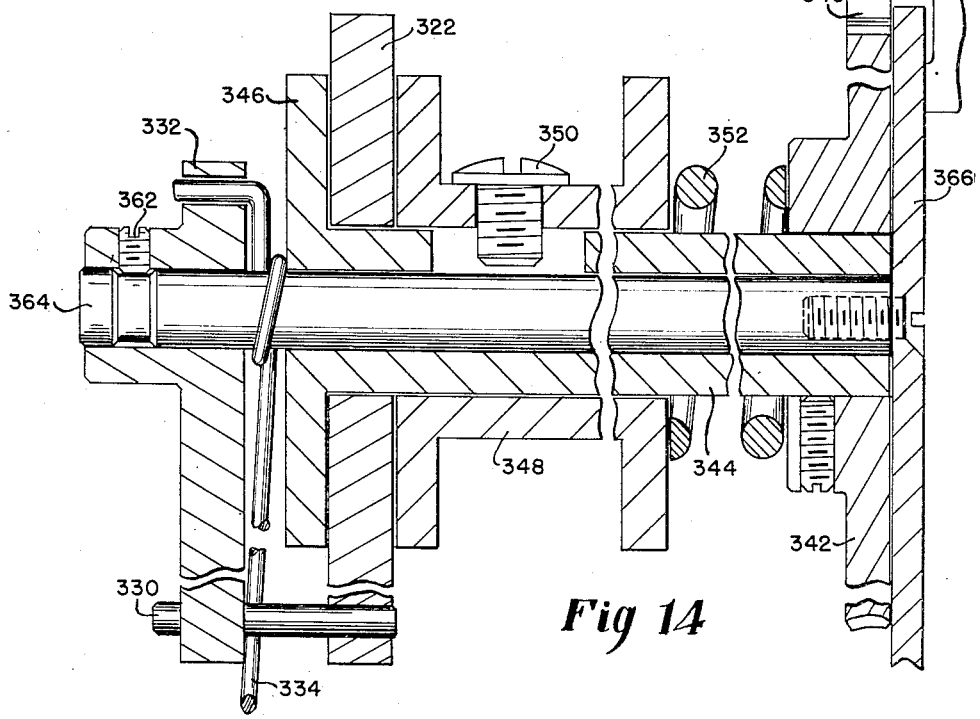
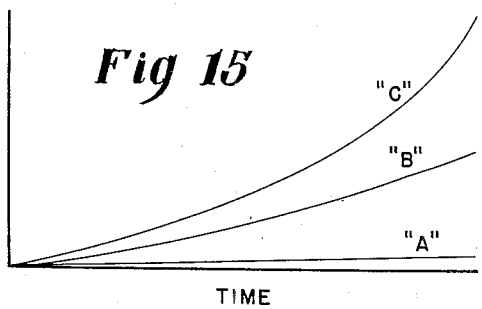

Patented May 9, 1950

2,506,814

UNITED STATES PATENT OFFICE 2,506,814

APPARATUS FOR THE ELECTRONIC HEATING OF MOLDING MATERIAL

Gordon B. Sayre, Boonton, N. J., assignor to Boonton Molding Company, Boonton, N. J., a corporation of New Jersey Application January 17, 1947, Serial No. 722,521

12 Claims. (Cl. 219—47)

This invention relates to electronic heating, and more particularly to the heating of pills in the molding of thermosetting materials.

The primary object of the invention is to generally improve electronic heating, and more particularly the heating of pellets or so-called "pills" of thermosetting material, preparatory to curing and molding the same to final shape.

In the electronic heating of pills, it is the present practice to make the electrodes a part of the radio frequency generator or driver, the entire driver being located immediately adjacent the molding press. Considering the fact that the presses are large and heavy and are already installed in position, it is often inconvenient to so locate the driver, and one object of the present invention is to make it possible to locate the driver remotely from the press while locating the electrodes immediately adjacent the press, with efficient radio frequency transmission therebetween. The electrodes are associated with a local inductor to provide a local tank circuit, which may, for convenience, be called a heating head. This is in addition to a tank circuit at the driver itself.

As the pill is heated it expands and its dielectric constant changes, thereby changing the capacitance of the electrodes, and so changing the resonant frequency of the electrodes and their associated circuit. In accordance with a further feature and object of the present invention, the spacing between the electrodes is automatically changed during the heating of the pill. From one viewpoint this may be said to be done in order to accommodate the expansion of the pill. From another viewpoint this is done in order to maintain the resonant frequency of the heating head approximately constant. For the latter purpose the rate of separation of the electrodes during the heating operation may be non-linear, and in one form of my invention such non-linear separation of the electrodes is provided for.

The present invention my be, and is preferably used in combination with the invention disclosed in my copending application, Serial Number 671,706, filed May 23, 1946, which discloses apparatus whereby a number of different sets of electrodes may be driven from a single driver. It will be apparent that the use of a heating head remote from the driver as disclosed herein, is of particular advantage when a number of heating heads are powered by a single driver, for in such case each head may be located immediately adjacent its associated molding press, and the driver may be located out of the way of all of the presses. Moreover, the aforesaid copending application discloses a remotely controlled variac which is automatically adjusted to supply different output potentials appropriately selected for each of the different size pills employed in the different presses, and the variac mechanism referred to is readily combined with that herein disclosed.

To the accomplishment of the foregoing general objects, and other more detailed objects which will hereinafter appear, the invention resides in the heating head and driver, and their relation one to the other, as are hereinafter more particularly described in the specification and sought to be claimed in the appended claims.

The specification is accompanied by drawings in which:

Figure 3 is a horizontal section taken approximately in the plane of the line 3—3 of Figure 1;

Figure 4 is a vertical section taken approximately in the plane of the line 4—4 of Figure 3;

Figure 5 is explanatory of the operation of the reversing switch;

Figure 6 is a portion of Figure 3 drawn to enlarged scale, and shows the speed adjusting mechanism;

Figure 7 is a partially sectioned end view of the mechanism shown in Figure 6;

Figure 13 is a detail;

Figure 14 shows a part of Figure 12, but in section and to enlarged scale;

Figure 15 is a graph related to the invention.

Figure 1:
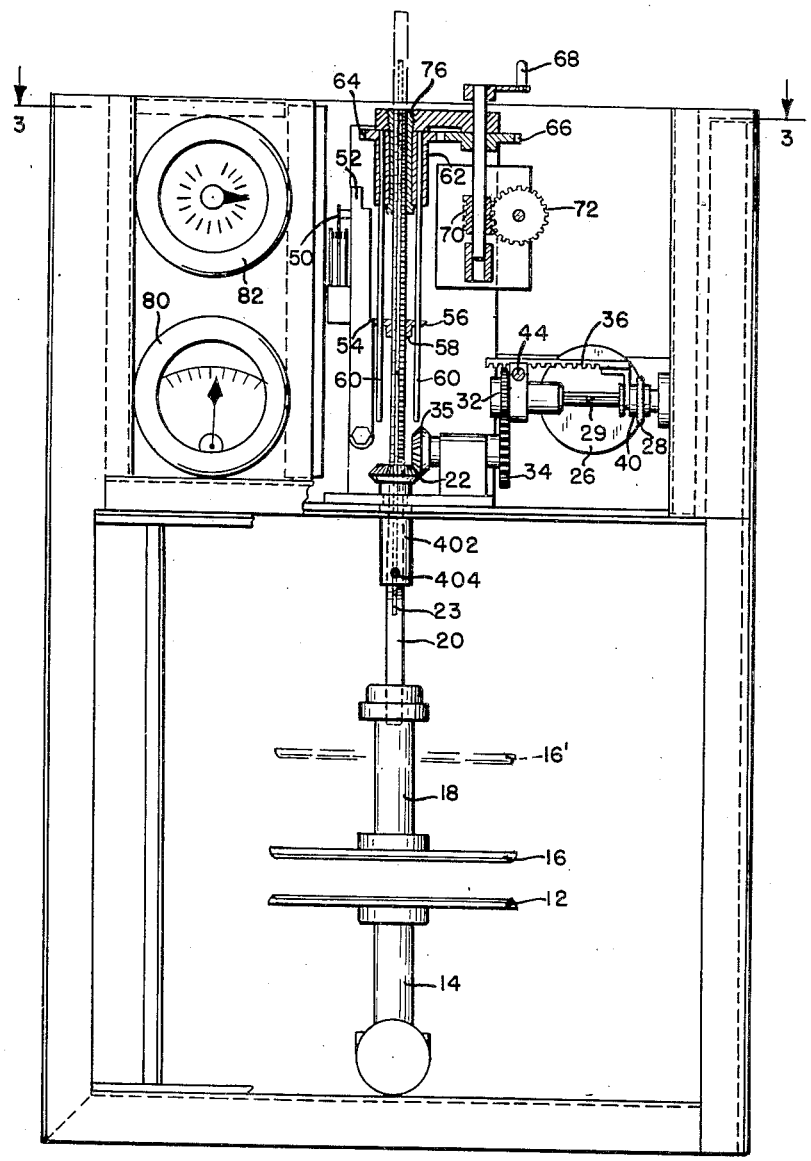
Figure 1 is a partially sectioned front elevation of a heating head embodying features of my invention.

Referring to the drawing, and more particularly to Figure 1, the pill to be heated is placed between electrodes 12 and 16. As the pill is heated its dielectric constant changes and it expands, and in accordance with the present invention, the electrodes are separated during the pill heating operation.

Figure 2:
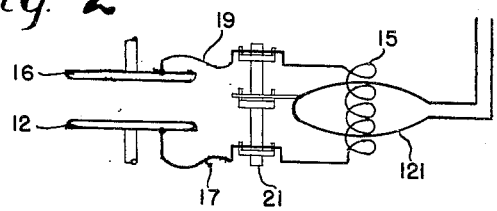
Figure 2 represents the head schematically.

Referring now to Figure 2, it will be seen that the electrodes 12 and 16 form a capacitor which is in shunt with an inductor 15, making up a resonant circuit. The expansion and change of dielectric constant of the pill varies the capacitance of the electrodes, and the separation of the electrodes provided by the present invention may be, and preferably is designed to maintain the frequency constant.

Reverting to Figure 1, the electrode 12 is insulatedly carried on a stationary insulator 14, and electrode 16 is insulatedly carried on a movable insulator 18. The electrodes are connected to the coil 15 (see Figure 2) by flexible metal straps 17 and 19 (omitted in Figure 1). Figure 2 also shows how the inductor may be mounted on a stationary insulator 21 by which the straps also are supported. The primary inductance or coupling coil 121 may also be supported by insulator 21.

The insulator 18 (Figure 1) is carried by a non-rotatable but vertically movable screw 20. This screw is provided with a key-way or longitudinal slot 23 and a stationary bushing 402 is provided with a pin 404 slidably received in the slot 23. The screw is threadedly received in a disc 56 which may for the moment be considered an immovable nut, although actually, as will later appear, it is both rotatable and vertically movable when adjusting the initial electrode spacing. The screw 20 may be raised or lowered by a mitre gear 22, the hole through which is threaded to receive the screw.

Referring now to Figures 3 through 7, gear 22 is driven by a motor 24 and friction wheels 26 and 28 pressed together by a compression spring 30. The shaft 29 of wheel 28 carries a gear 32 meshing with a gear 34 which in turn drives a mitre gear 35 meshing with mitre gear 22 previously referred to.

In order to provide for adjustment of the rate of separation of the electrodes, the friction wheel 28 is axially movable, as by means of a rack 36 carrying a yoke 38 received in a grooved collar 40 forming a part of wheel 28. Wheel 28 is slidably keyed to shaft 29 by means of slot 408 and pin 410, in order to rotatively connect wheel 28 with gear 32 despite axial movement of wheel 28. The rack 36 is guided by a rod 412 slidable in a bushing 414, the rack being connected to the guide rod by yoke 38 at one end and a block 416 at the other end. The rack is moved by a pinion 42 (Figures 6 and 7) on a shaft 44 turned by a handle 45 having a dial 47 and pointer 49. It will be understood that by rotating the handle the axial position of wheel 28 is changed, thereby changing the speed of movement of the upper electrode 16.

The speed employed is determined by experiment, to take care of the expansion of the pill and any frequency correction needed. In order to judge the efficiency of operation, the power may be observed on a meter 80 shown in Figure 1.

The initial spacing of the electrodes is readily adjustable, and is determined by the thickness of the particular pill being molded, this spacing being usually about ⅛" greater than the thickness of the pill in order to facilitate insertion of the pill between the electrodes. This initial spacing of the electrodes may be set by means of another control handle indicated at 68 in Figure 1. For this purpose, the motor 24 previously referred to is a reversing motor which may be driven in either direction by contacts which are best shown in Figure 5. The outer contacts 49 and 51 are stationary, while the center contact 50 is moved in either direction by a floating bar 52 having a tapered shoulder 54 cooperating with the tapered edge of disc 56 (which was previously described as a nut in which the screw 20 is received). Disc 56 may be rotated by a pair of pins 60 carried by hub 62 of gear 64 (see Figure 1) which gear meshes with a gear 66 turned by crank 68. The shaft of crank 68 also carries a worm 70 meshing with a gear 72 which turns a pointer 74 (Figure 3) cooperating with a scale 75. The gear 64 and hub 62 are rotatably carried by a sleeve 76 which is fixed in position, and which holds the gear and hub against axial movement. The sleeve 76 receives the screw 20 with ample clearance for sliding movement.

If the pill is, say 1" thick, the crank 68 is turned until the pointer 74 is set at 1" on scale 75. This will provide an electrode spacing of say, 1 and ⅛". If the crank is turned, the disc 56 is screwed along the screw 20, but this immediately displaces the floating lever 52 either to the left or to the right, thereby closing a circuit to contact 49 or 51, which in turn drives the motor in that direction which tends to reestablish equilibrium by raising or lowering the screw until the disc is again properly related to the floating lever.

In passing, it may be mentioned that it is not essential to have the two tapers 54 and 56, it being sufficient if one or the other of these parts is tapered.

When the heating cycle is started, the reversing contacts are cut out of operation, and the motor runs continuously in one direction, thereby separating the electrodes through the friction drive previously described, and at a speed determined by the adjustment of the friction drive. The duration of the heating cycle is controlled by a timing clock indicated at 82 in Figure 1, and when the time set on the clock runs out, the circuit is again changed to bring back into operation the reversing contacts. Inasmuch as the disc 56 has meanwhile moved far above the shoulder on floating lever 52, the reversing motor immediately runs in opposite direction until the movable electrode is brought back to the proper initial position, preparatory to the next heating operation.

The wiring associated with the motor may be explained with reference to Figure 8. The reversing contacts previously described are shown at 49, 50, and 51. The reversing motor is indicated at 24, this being a two-phase motor having field coils 204 and 206, and a condenser 208 to shift the phase from a single phase source in order to make the motor self-starting. When the contacts are closed to the coil 204, the condenser is connected in series with the coil 206, and when the contacts are closed to the coil 206, the condenser is connected in series with the coil 204. This reverses the motor.

To start the heating operation, the operator presses a starting button 210 which energizes a relay generally designated 212. More specifically, current flows from L—2 through the normally closed timing clock contacts 214 to the button 210 (which is closed by the operator), and thence through coil 216 of the relay, and back to L—1. Current also flows through the timing clock motor 218 back to L—1. Magnet coil 216 of the relay closes contacts 220 and reverses contacts 222. Contacts 220 simply parallel the push button 210 and thereby cause the relay to act as a "stick" relay, so that coil 216 remains energized after button 210 is released.

Current from L—2 runs from central contact 222 to the lower contact and then to coil 206 of the motor. It also flows through the condenser 208 and coil 204. This causes the motor to run in that direction which moves the electrode upwardly, and at this time the reversing contacts 49, 50, and 51 are inoperative. When the timing clock has run out, the contacts 214 open, and this interrupts the current to coil 216, thus permitting contacts 220 to open, and changing contact 222 from the down position to the up position. The timing clock is so constructed that it immediately resets, with the contacts 214 again closed preparatory for the next timing operation. In the meantime, current from L—2 goes from the contact 222 to the top contact and thence to the center contact 50 of the reversing contact group, thereby reestablishing the reversing circuit. At this time the electrode 16 (Figure 1) is in elevated position, and therefore contact 50 (Figure 8) will be closed to contact 49, and current will flow through field coil 204, and will also flow in series through condenser 208 and field coil 206, thereby running the motor in the opposite direction, and so lowering the electrode until initial position is reached, at which time the contacts 49, 50, 51 are again centralized.

Figure 8:
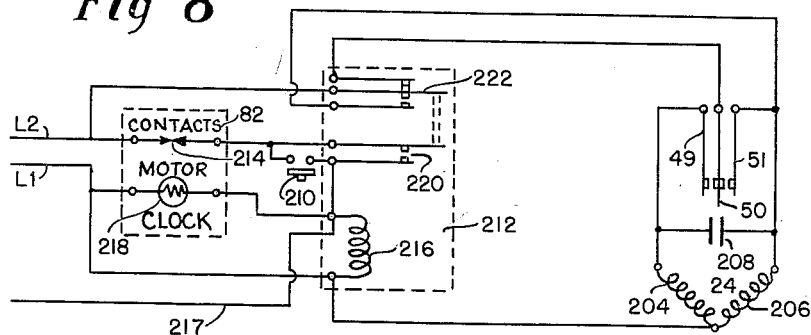
Figure 8 is a wiring diagram explanatory of the invention.

The conductor 217 in Figure 8 controls the radio frequency driver, and is energized when the starting button is pressed. The driver is shut down when the timing clock runs out and contacts 214 are opened and conductor 217 is deenergized.

Figure 9:
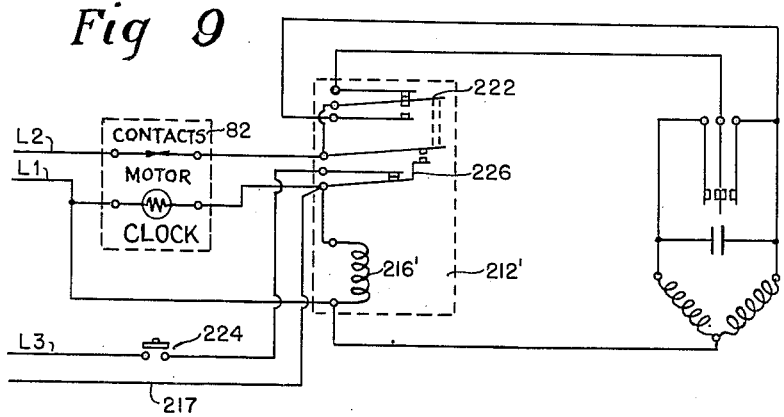
Figure 9 is a wiring diagram modified for use with the invention of my copending application, Serial Number 671,706.

The diagram of Figure 9 differs from that shown in Figure 8, in that the double contact group 220 of Figure 8 is replaced with a triple contact group 226, and the starting button 224 is connected in a separate conductor L—3. This minor modification of the wiring adapts the apparatus for use with the invention disclosed in my copending application, Serial Number 671,706, previously referred to, the conductor L—3 providing a connection to the variac control there disclosed. This is a connection common to the stationary buttons of all of the heads. As in the case of Figure 8, the operator presses a starting button 224, and current then flows to the middle contact of group 226, and then to coil 216' of relay 212'. This causes the relay coil 216' to pull the connected contacts downward, thereby reversing the upper contacts 222, and closing the upper contact of group 226 before opening the center contact of group 226. Inasmuch as the upper contact of group 226 is wired directly from L—2 through the clock contacts to coil 216', the relay remains locked. However, the line to the starting button through the center contact of group 226 is now broken, so that it will not be possible for the starting button to place current on L—3 after the current is removed from L—3 to the variac control. This provides an interlock for use with multiple heating heads driven from a single driver. If L—3 could be kept alive after the variac control starts from zero position (which it cannot be in the present circuit) it would be possible for the other heads with their starting buttons connected to L—3 to also be closed. With the present arrangement only one head at a time can be operated.

Figure 10:
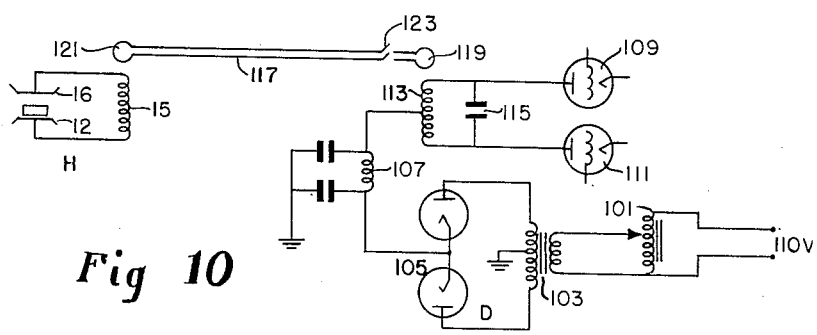
Figure 10 is a schematic wiring diagram of the radio frequency circuit.

The radio frequency wiring is schematically shown in Figure 10. The driver, generally designated D, may be remote from the head, generally designated H. The driver is powered from a regular 110 volt source, preferably through a variac 101, to a step-up transformer 103, which may step the voltage up from, say 100 volts to 4,000 volts. This is rectified in a suitable rectifier, here indicated as a full wave rectifier 105 and the rectified output is filtered at 107 and applied to the anodes of tubes 109 and 111, which are operated in push-pull. The tank circuit of the oscillator is indicated by inductor 113 and capacitor 115. The grid circuit is not shown and may be conventional, it being appropriately regeneratively coupled to the anode circuit in any desired customary manner.

The resonant circuit of the head is made up of the electrodes 12 and 16 acting as a capacitor, and an inductor 15. The driver is connected to the head by a transmission line 117, preferably a radio frequency cable. This is appropriately coupled to the driver and the head with impedance changing means, in order to match the impedance of the line. In the present case, single loops 119 and 121 are shown for coupling purposes. A switch 123 is shown for use when a single driver powers a number of heads, as disclosed in my copending application, Serial Number 671,706. This switch is not needed when the driver powers only one head.

The transmission line 117 is most conveniently a radio frequency cable. Open spaced bare conductors might be used, but are awkward in a molding plant full of piping, and they also radiate considerable stray power. The cable 117 must have its impedance matched at the ends, or the transmission of power between the driver and the head will be inefficient. I prefer tuned transmission lines, that is, lines of resonant length (half wave, full wave, wave and half, etc.). It is important to maintain the resonant frequency at the head by appropriately varying the electrode spacing as described above. If the line is tuned, it will obviously be thrown out of tune by a departure from resonance frequency. However, even if the line were "flat" or untuned, the reflection of impedance from the head to the line on a departure from tuning would spoil the desired impedance match, and thereby ruin efficient power transmission.

As so far described, the electrodes are separated during the heating operation linearly, that is, at a uniform rate. A modified form of the invention is illustrated in Figures 11 through 14. This modification has the advantage of making possible a non-linear separation of the electrodes. This produces a closer approximation to constant tuning of the head. The modification also provides for quick return movement of the electrodes at the end of the heating operation, which is unimportant in some cases, but may be desirable in others.

Figure 11:
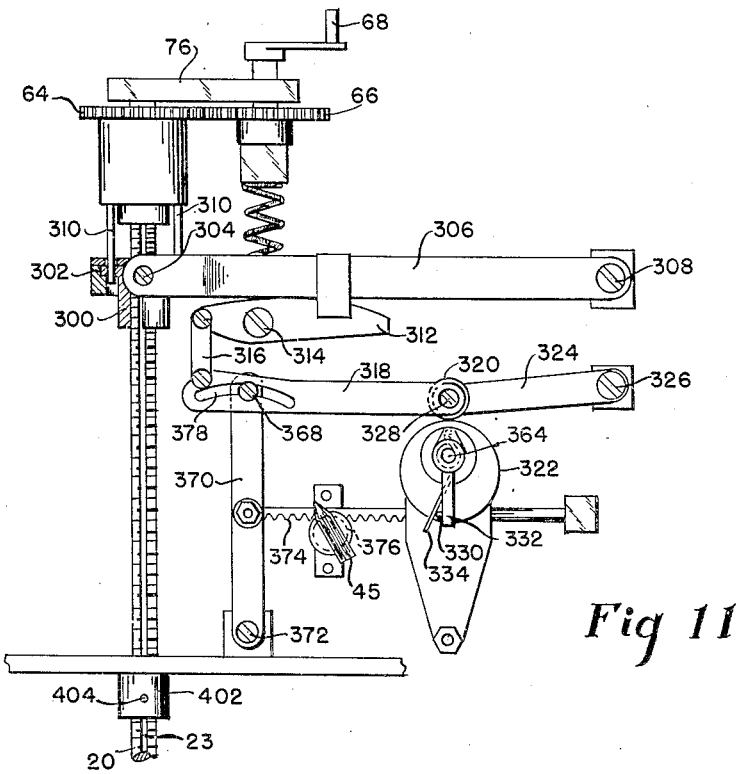
Figure 11 shows a modified mechanism for varying the electrode spacing.

Referring to Figure 11, the slotted screw 23, bushing 402, and pin 404 all correspond to similarly numbered parts in Figure 1. The same applies to crank 68, gear 66, gear 64, and support 76. Threaded disc 300 is somewhat like disc 56 in Figure 1, but is housed in a bearing 302 having trunnions 304 carried in the bifurcated end of a lever 306, which is pivoted at 308. The two vertical pins 310 correspond to pins 60 in Figure 1, except that pins 310 may be much shorter because they need take care of only the "tuning" movement, for which ½" is more than adequate. Lever 306 is a cam follower which rests on and is moved by a cam 312 which is pivoted at 314, and moved by link 316, which is connected to a lever 318. The opposite end of lever 318 carries a cam roller 320 resting on a second cam 322. In the particular case here shown the second cam 322 is simply an eccentric, which would produce approximately sine wave movement, except that only a part of a revolution is used. The roller 320 is guided by a support arm 324, pivoted at 326, and pivotally connected to the lever 318 by a pin 328, as is best shown in Figure 13. The cams 322 and 312 together make up cam means for separating the electrodes during the pill heating operation.

Eccentric 322 is driven by a synchronous clock motor 336 (Figures 12 and 14) with reduction gearing resulting in slow speed (say 2 R. P. M.) on output shaft 338. Pinion 340 drives gear 342 at, say ½ R. P. M. or less. Gear 342 is fixed to a sleeve 344 (Figure 14) which carries at its opposite end a clutch plate 346. An axially slidable spool 348 rotates with sleeve 344 by reason of a pin 350, conveniently in the form of a screw, but is slidable on sleeve 344 because pin 350 is received in an axially directed slot in sleeve 344. Cam 322 is frictionally held between clutch plate 346 and spool 348, under compression of a spring 352.

The clutch is normally disengaged by the action of a dominating compression spring 354 (Figure 12), pressing a shift lever 356, pivoted at 358, and whose upper end bears against the inside of spool 348. Lever 356 may be moved counterclockwise against the action of spring 354 by means of a solenoid 360. When the solenoid is energized the clutch is engaged, and eccentric 322 is driven by the motor. During its rotation the eccentric 322 winds up a restoring spring 334, one end of which bears against a pin 330 carried by eccentric 332, and the other end of which is attached to a stop 332. The position of stop 332 may be changed by loosening a set screw 362 engaging a stationary shaft 364 acting as a mounting for the parts referred to, its opposite end being fixed in a frame plate 366.

Lever 318 fulcrums on a pin 368 which, for the present, may be considered a stationary fulcrum. The eccentric 322 raises roller 320 and lowers the link 316, and consequently pivots cam 312 on fulcrum 314, thereby raising lever 306, and with it the disc 300, the screw 23, and the upper electrode.

The cam contours are developed to take care of non-linear separation, and also the variation of tuning required for larger or smaller pill thickness. This may be explained with reference to Figure 15, which shows the mistuning caused by heating of the pill as a function of the heating time. The curve A represents a thin pill; the curve B a medium thickness pill, and the curve C a thick pill.

Curve B for medium thickness pills illustrates the non-linearity of the desired electrode movement. This result is readily obtained by the combined action of the cams 322 and 312. The cam 322 being in this case a simple eccentric, would produce a sine wave-motion, but inasmuch as the time of treatment is only fraction of a minute, a desired portion of the sine wave curve may be selected to compensate for the frequency change shown by curve B of Figure 15. This is done by changing the position of the stop 332. The action of cam 312 is complex because of the shifting point of contact with the follower lever 306, but I have gotten good results with a cam having a contour which is part of a parabolic curve.

Referring again to Figure 15, the change from curve B to curve A or C for thinner or thicker pills is a change in rate of compensation, rather than a change in the nature of the curve. Reverting now to Figure 11, a change in rate may be obtained by shifting the position of fulcrum 368 along lever 318. For this purpose pin 368 is carried by an arm 370 pivoted at 372, and movable by a rack 374 and pinion 376 (This corresponds to rack and pinion 36 and 42 shown in Figures 6 and 7.) Pin 368 is received in a slot 378, formed on the radius of arm 370 around pivot 372, so that readjustment will not itself move cam 312 (with the eccentric in low position). Adjustment of the rack shifts the fulcrum and so changes the extent of rotation of cam 312. An increase in rotation increases the rate of movement, as would be desired to satisfy curves such a A, B, and C in Figure 15.

Figure 12:
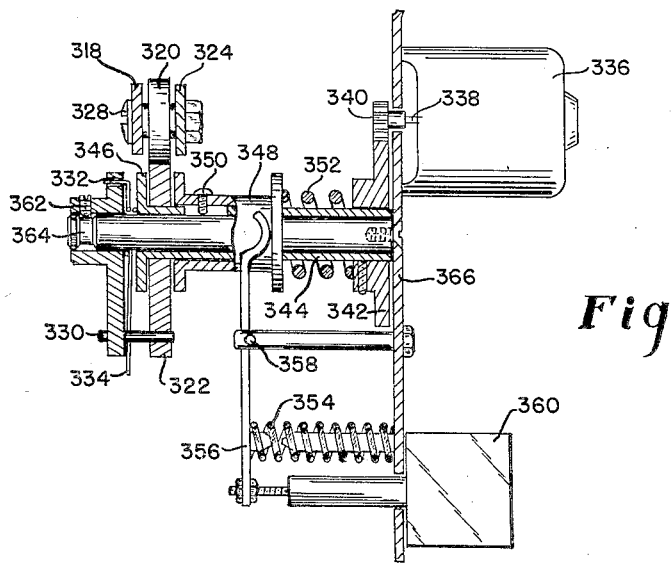
Figure 12 is a view of said mechanism looking in a plane perpendicular to that shown in Figure 11.

Motor 336 may be connected in parallel with solenoid 360, so that the motor will run only during the heating operation. Both are connected to the lower contact of the upper group 222 of relay 212 in Figure 8. The top contact of group 222 is eliminated, as are reversing contacts 49, 50, and 51. The same motor may be used, but runs in one direction only. In effect, the solenoid 360 of Figure 12 is connected across the top and bottom conductors shown in Figure 8.

Figure 9 is used in exactly the same way, with exactly the same omissions, if the invention is combined with the disclosure of my copending application, Serial Number 671,706, previously referred to.

It was earlier stated that the compensation for heating has an electrode movement of say ½" available. However, the change in initial electrode spacing for different thickness pills is much greater. In the present case 2½" is available by the action of crank 68 to rotate the disc 300. Much more range could be provided if needed, but at present has not been found necessary.

At the end of the pill heating operation the clock (82 in Figure 8) opens its contacts, releasing relay 212 (Figure 8) and solenoid 360 (Figure 12) and stopping motor 336. Dominant spring 354 thereupon releases clutch 346, 348, thus permitting spiral spring 334 to return eccentric 322 to initial position with pin 330 against stop 332. Although the pill has not yet been removed, the lowered top electrode simply rests on the pill, lever 306 (Figure 11) separating from cam 312. It has been found that this does not interfere with removal of the pill. The instantaneous return of the top electrode is an advantage over the first form of the invention described, in which the return is relatively slow.

It is believed that the construction and operation of my invention, as well as the many advantages thereof, will be apparent from the foregoing detailed description.

The electrode spacing is preliminarily set by adjustment of the handle 68, according to the thickness of the pill. The variac 101 is set for the optimum radio frequency voltage output on the electrode. The time clock 82 is set for the appropriate time of heating. The apparatus is then operated, and the meter 80 is observed to watch for best power absorption in the pill. The speed of separation of the electrodes is readjusted by means of the handle 45 to obtain best efficiency, or maximum meter reading. The time clock may then need readjustment. Thereafter, in operation it is merely necessary to press the button 210 each time a pill is inserted in the head. The electrodes are automatically properly spaced as the pill is heated. At the end of the heating operation the pill is removed and the electrodes automatically come back to proper initial spacing.

Because of the maintained tuning or resonance frequency, the pill is heated at best frequency; there is a minimum of interference with other radio channels; and efficient power transmission of a radio frequency power line may be maintained because the impedance match of the line is retained. The possibility of using such power lines, particularly the modern convenient flexible high frequency cables, makes it possible to space the driver remote from the head, and facilitates the use of a single driver to energize any one of a plurality of heads.

It will be understood that while I have described the invention with reference to automatic tuning to maintain proper impedance match and best heating frequency, the invention may be more broadly described with reference to maintaining substantially uniform power absorption in the material being heated. In fact, it makes possible the maintenance of maximum power absorption, but that in itself is not always desired, for if ample heating time is available it may be preferred to cut down the rate of heating and to increase the time of heating.

Although I have described the invention applied to the heating of pills of thermosetting material, the invention is applicable to other materials having electrical characteristics which change substantially as the material is heated. In some cases this may make a reduction in the electrode spacing desirable, instead of an increase in spacing.

There being some question about the significance of changes in dielectric constant, power factor, dimension, etc., the invention may, if desired, be considered empirical, with the change in electrode spacing determined experimentally.

While I have shown and described apparatus in which one electrode is stationary, and the other is moved both for frequency control and for adjustment of initial spacing, both electrodes may be moved, or most simply, the two kinds of movement may be separated, and one of the electrodes may be mounted for frequency control movement alone, and the other electrode may be mounted for movement to adjust the initial spacing of the electrodes.

It will therefore be understood that while I have shown and described my invention in preferred forms, many changes and modifications may be made in the structures disclosed without departing from the spirit of the invention, as sought to be defined in the following claims.

I claim:

1. Pill heating apparatus for heating pills preparatory to molding the same in a molding press, said apparatus including a heating head comprising electrodes so spaced as to readily receive a pill therebetween, a screw carrying one of the electrodes, means threadedly receiving said screw for adjusting the initial electrode spacing, motor driven means to relatively rotate the screw and the means threadedly receiving the same in order to automatically separate the electrodes at a predetermined desired rate during heating of the pill, and speed regulating means to predetermine the rate at which the motor separates the electrodes.

2. Pill heating apparatus for heating pills preparatory to molding the same in a molding press, said apparatus including a heating head comprising electrodes so spaced as to readily receive a pill therebetween, and means to automatically separate the electrodes during heating of the pill in order to accommodate expansion of the pill as it is heated, said means including a screw connected to one of the electrodes, a motor for moving the screw, speed regulating means adjustable in advance in order to predetermine the speed of movement of the screw to separate the electrodes at a predetermined desired rate, threaded means engaging the screw, and additional means for relatively rotating said threaded means and said screw for adjusting the initial spacing of the electrodes.

3. Pill heating apparatus for heating pills preparatory to molding the same in a molding press, said apparatus including a heating head comprising electrodes so spaced as to readily receive a pill therebetween, and means to automatically separate the electrodes during heating of the pill in order to accommodate expansion of the pill as it is heated, said means including a support connected to one of the electrodes, a motor for moving the support, and means for adjusting the speed of movement of the support to be at a predetermined desired rate, said means including a control handle, a pinion moved by said handle, and a rack moved by said pinion.

4. Pill heating apparatus for heating pills preparatory to molding in a molding press, said apparatus including a heating head comprising electrodes so spaced as to readily receive a pill therebetween, means to automatically change the spacing of the electrodes during the heating of the pill, speed regulating means to predetermine the rate at which said means changes the spacing of the electrodes, and means to automatically vary said rate during the heating of the pill, whereby the spacing is changed at a predetermined desired variable rate.

5. Pill heating apparatus for heating pills preparatory to molding in a molding press, said apparatus including a heating head comprising an inductor, a stationary bottom electrode, an elevatable top electrode, said electrodes acting as a capacitance and being so spaced as to readily receive a pill therebetween, means to automatically raise the top electrode during the heating of the pill in order to accommodate expansion of the pill as it is heated, speed regulating means to predetermine the rate at which said means increases the spacing of the electrodes, and means to automatically increase the said rate during heating of the pill, in order to automatically maintain an approximately constant resonant frequency for the head during expansion of the pill, said means for raising the top electrode being so arranged as to raise it at a predetermined desired accelerating rate.

6. Pill heating apparatus for heating pills preparatory to molding the same in a molding press, said apparatus including a heating head comprising an inductor, spaced electrodes acting as a capacitance and so spaced as to receive a pill therebetween, and means to automatically move an electrode during the heating of the pill, said means including cam means, cam follower means, and linkage including a lever with a shiftable fulcrum such that movement of the fulcrum accelerates the movement caused by the cam means.

7. Pill heating apparatus for heating pills preparatory to molding the same in a molding press, said apparatus including a heating head comprising an inductor, spaced electrodes acting as a capacitance and so spaced as to readily receive a pill therebetween, and means to automatically move an electrode during the heating of the pill, said means including a screw connected to said electrode, a nut receiving said screw, cam means, cam follower means and linkage connected to said nut, said linkage including a lever with a shiftable fulcrum such that movement of the fulcrum accelerates the movement caused by the cam means, and an additional control device for relatively rotating the nut and screw in order to adjust the initial spacing of the electrodes.

8. Pill heating apparatus for heating pills preparatory to molding the same in a molding press, said apparatus including a heating head comprising electrodes so spaced as to receive a pill therebetween, and means to automatically separate the electrodes during the heating of the pill, said means including cam means, cam follower means connected to the movable electrode, and a motor for slowly rotating the cam means, said cam means being so designed as to move the electrode at a desired non-linear rate.

9. Pill heating apparatus for heating pills preparatory to molding the same in a molding press, said apparatus including a heating head comprising electrodes so spaced as to receive a pill therebetween, and means to automatically separate the electrodes during the heating of the pill, said means including cam means, cam follower means connected to one of the electrodes, a spring for returning the cam means to initial position, a motor for slowly rotating the cam means away from initial position, and clutch means for coupling the motor to the cam means during the heating operation and for releasing the cam means from the motor at the end of the heating operation.

10. Pill heating apparatus for heating pills preparatory to molding the same in a molding press, said apparatus including a heating head comprising electrodes so spaced as to receive a pill therebetween, and means to automatically separate the electrodes during heating of the pill, said means including cam means, cam follower means connected to an electrode, a spring for returning the cam means to initial position, externally adjustable means to determine the initial spacing of the electrodes, a motor for slowly rotating the cam means away from initial position, and clutch means for coupling the motor to the cam means during the heating operation and for releasing the cam means from the motor at the end of the heating operation.

11. Pill heating apparatus for heating pills preparatory to molding the same in a molding press, said apparatus including a heating head comprising an inductor, spaced electrodes acting as a capacitance and so spaced as to receive a pill therebetween, and means to automatically move an electrode during the heating of the pill in order to maintain an approximately constant resonance frequency for the head during heating of the pill, said means including cam means, cam follower means connected to the movable electrode, and a motor for slowly rotating the cam means, said cam means being so designed as to move the electrode at a desired non-linear rate.

12. Pill heating apparatus for heating pills preparatory to molding the same in a molding press, said apparatus including a heating head comprising an inductor, spaced electrodes acting as a capacitance and so spaced as to receive a pill therebetween, and means to automatically move an electrode during the heating of the pill in order to maintain an approximately constant resonance frequency for the head during heating of the pill, said means including cam means, cam follower means connected to the movable electrode, a torsion spring for returning the cam means to initial position an externally adjustable means to determine the initial spacing of the electrodes, a motor for slowly moving the cam means away from initial position during the heating operation, and readily adjustable means to change the rate of movement of the cam means.

GORDON B. SAYRE.

REFERENCES CITED

The following references are of record in the file of this patent:

UNITED STATES PATENTS

| Number | Name | Date |
| --- | --- | --- |
| 2,202,759 | Denneen et al. | May 28, 1940 |
| 2,396,004 | Gilbert | Mar. 5, 1946 |
| 2,416,172 | Gregory et al. | Feb. 18, 1947 |
| 2,446,032 | Watts et al. | July 27, 1948 |